No. 830,029. PATENTED SEPT. 4, 1906.
A. WAIBL.
WATER GAGE.
APPLICATION FILED FEB. 10, 1905.
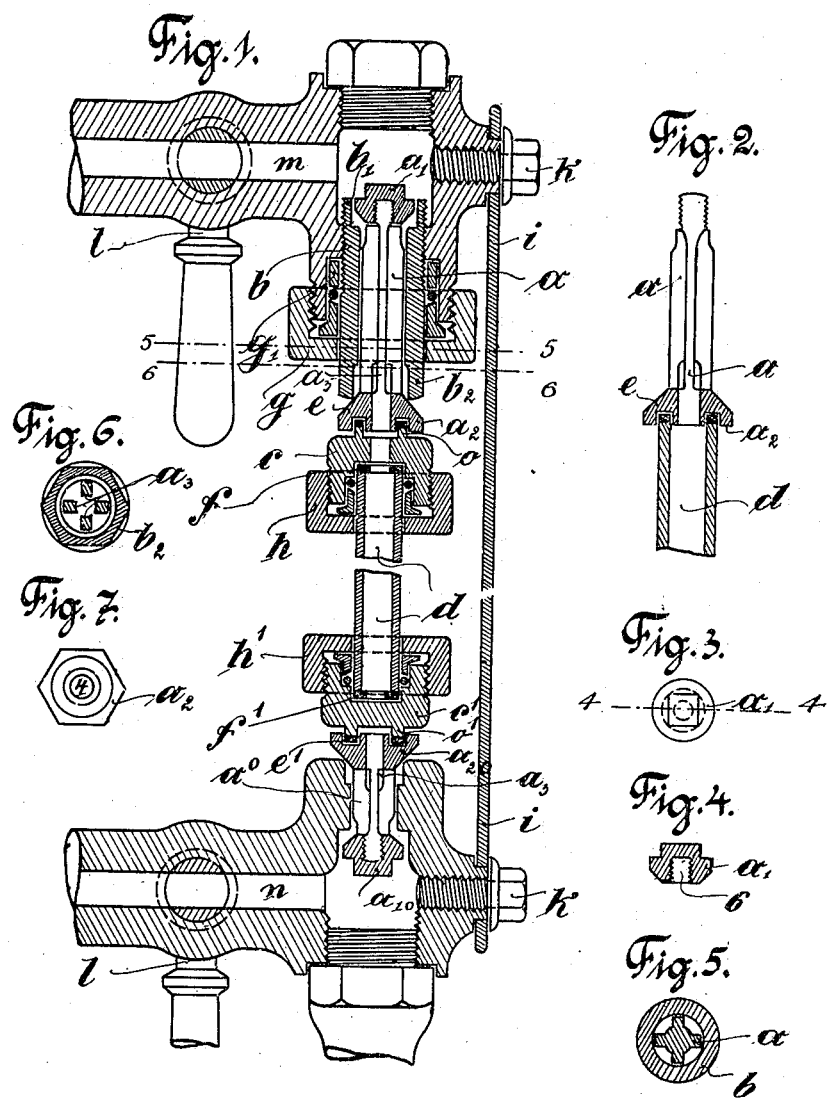
Witnesses
Inventor
Albert Waibl
By his Attorney

UNITED STATES PATENT OFFICE.

ALBERT WAIBL, OF KIEL, GERMANY.

WATER-GAGE.

No. 830,029.

Specification of Letters Patent.

Patented Sept. 4, 1906.

Application filed February 10, 1905. Serial No. 245,149.

*To all whom it may concern:*

Be it known that I, ALBERT WAIBL, a subject of the German Emperor, residing at Kiel, Germany, have invented certain new and useful Improvements in Water-Gages, of which the following is a specification.

This invention relates to improvements in water-gages for use in connection with steam-boilers and the like.

Stop-cocks and the like for use in connection with water-gages and adapted to be automatically closed in case the gage-glass breaks are already known; but they have hitherto had the disadvantage of comprising a cone-valve or the like which had to be operated for the purpose of "blowing off" through the gage. Valves of this kind consequently became coated with sediment and were thus not only rendered inoperative in case of fracture, but also prevented the working of the gage under normal conditions. In some cases the valves referred to were spring-actuated, and this had the additional disadvantage that the strength of the springs was effected by changes of temperature. For preventing the choking of the valve by sediment the said valve has in some cases been held open under normal conditions by means of a glass rod arranged in such a manner that it was caused to break when a fracture of the gage-glass occurred. This arrangement had the disadvantage that the glass rod used was liable to become broken while the gage-glass remained unbroken, and the working of the gage was thus unnecessarily interrupted.

Certain devices which have been designed to overcome the disadvantages indicated are so complicated that they can only be cleaned when the boiler to which they are connected is not working.

The object of the present invention is to remove the disadvantages in question without complicating the construction of the apparatus, and the arrangement used for this purpose is illustrated in the annexed drawings, in which—

Figure 1 is a longitudinal section of the apparatus. Fig. 2 is a detail view, partly in section, of a modification. Fig. 3 is a plan view of one of the valves. Fig. 4 is a cross-section thereof on line 4 4, Fig. 3. Figs. 5 and 6 are sections of the sleeve and valve-stem on the lines 5 5, 6 6, respectively, of Fig. 1. Fig. 7 is a plan view of another valve.

The improved apparatus comprises two tubular supports $m$ and $n$, adapted to be placed in communication with the interior of a boiler. Into the upper support $m$ is screwed a sleeve $b$, the ends $b'$ and $b^2$ of which are adapted to serve as seats for the conical parts $a'$ and $a^2$, respectively, of a valve $a$, guided in the said sleeve $b$. The lower support $n$ is provided with seats for the conical parts $a^{10}$ and $a^{20}$ of a similar valve $a^0$. When the gage-glass $d$ is placed in position, the sockets $c\ c'$, into which the ends of the said glass are inserted, press the valve parts $a^2$ and $a^{20}$ against their seats, the said sockets being provided with annular flanges $o\ o'$, respectively, adapted to enter corresponding recesses with which the valve parts are provided, packing $e\ e'$ being interposed between the flanges and recesses. The joints between the ends of the gage-glass and the sockets $c\ c'$ are made tight by means of suitable packing $f\ f'$ or the like held in position by nuts $h\ h'$, and the joint between the support $m$ and the sleeve $b$ is made tight in a similar manner by means of packing $g'$, held in position by a nut $g$. The supports $m$ and $n$ are connected with each other by means of a rod $i$, held in position by means of screws or bolts $k\ k'$. Stop-cocks $l$ and $l'$, respectively allow of closing the conduits in the supports $m$ and $n$.

The action of the device is as follows: When the glass breaks, the valves $a$ and $a^0$ lose the support afforded by the gage-glass $d$ and are forced toward each other by the pressure in the boiler, so that the conical valve members $a'$ and $a^{10}$ are pressed against their seats and cut off the passage of steam and water, respectively, from the boiler. The pressure-surface of the conical member $a'$ is in such ratio to the annular aperture normally left open by said member that the automatic closing of the valve must take place. The seating-surface of said member $a'$ is outside the actual overpressure-chamber, contrary to the case in the apparatus hitherto known. The annular aperture normally left by the valve member $a^{10}$ is somewhat larger than that left by the member $a'$ in order to allow of more readily removing dirt by blowing off.

The sleeve $b$ screwed into the upper support is provided with left-hand threads in order that it will not be unscrewed when the nut $g$, which has a right-hand thread, is tightened up.

The rod $i$ is for the purpose of preventing the forcing apart of the supports $m$ and $n$ when the glass is inserted and the sleeve $b$ screwed down to place on the upper end of the glass.

The outer edges of the parts $a^2$, $a^{20}$, and $b^2$ are polygonal, preferably hexagonal, for purposes of adjustment, and the edges of the parts $a'$ $a^{10}$ also polygonal—for instance, square—so that they may be screwed up tightly on the respective valve-rods.

I claim—

1. In a water-gage the combination of a support adapted to be connected to the boiler having a chamber with screw-threaded orifice and a stuffing-box concentric therewith, a sleeve having a valve-seat at each end partly screw-threaded to engage said orifice and partly cylindrical to coöperate with said stuffing-box, another support having a chamber with an orifice forming internal and external valve-seats, valves connected in two oppositely-acting pairs to coöperate with the said valve-seats respectively, the external valves being formed with annular grooves to receive packing-rings and a gage-glass forming a steam-tight connection with said packing-rings.

2. In a water-gage the combination of a support adapted to be connected to the boiler having a chamber with screw-threaded orifice and a stuffing-box concentric therewith, a sleeve having a valve-seat at each end partly screw-threaded to engage said orifice and partly cylindrical to coöperate with said stuffing-box, another support having a chamber with an orifice forming internal and external valve-seats, valves connected in two oppositely-acting pairs to coöperate with the said valve-seats respectively, the external valves being formed with annular grooves to receive packing-rings and a gage-glass and a pair of stuffing-boxes on the ends of said gage-glass having annular ribs forming a steam-tight connection with said packing-rings.

In witness whereof I have signed this specification in the presence of two witnesses.

ALBERT WAIBL.

Witnesses:
JULIUS RÖPKE,
CARL FUHLIJAHN.